Dec. 8, 1959 G. H. WILCOX 2,915,993
MACHINE FOR MOLDING PLIABLE PLASTIC MATERIALS
Filed July 29, 1955 8 Sheets-Sheet 1

INVENTOR.
GORDON H. WILCOX
BY Anthony J. Turchetti
ATTORNEY.

Dec. 8, 1959 G. H. WILCOX 2,915,993
MACHINE FOR MOLDING PLIABLE PLASTIC MATERIALS
Filed July 29, 1955 8 Sheets-Sheet 3

Fig. 3.

INVENTOR.
GORDON H. WILCOX
BY Anthony J. Turchetti
ATTORNEY.

INVENTOR.
GORDON H. WILCOX
BY Anthony J. Turchetti
ATTORNEY.

Dec. 8, 1959 G. H. WILCOX 2,915,993
MACHINE FOR MOLDING PLIABLE PLASTIC MATERIALS
Filed July 29, 1955 8 Sheets-Sheet 6

INVENTOR.
GORDON H. WILCOX
BY Anthony J. Turchetti
ATTORNEY.

Dec. 8, 1959  G. H. WILCOX  2,915,993
MACHINE FOR MOLDING PLIABLE PLASTIC MATERIALS
Filed July 29, 1955  8 Sheets-Sheet 7

INVENTOR.
GORDON H. WILCOX
BY Anthony J. Turchetti
ATTORNEY.

Dec. 8, 1959  G. H. WILCOX  2,915,993
MACHINE FOR MOLDING PLIABLE PLASTIC MATERIALS
Filed July 29, 1955  8 Sheets-Sheet 8

INVENTOR.
GORDON H. WILCOX
BY Anthony J. Turchetti
ATTORNEY.

United States Patent Office 2,915,993
Patented Dec. 8, 1959

2,915,993

MACHINE FOR MOLDING PLIABLE PLASTIC MATERIALS

Gordon H. Wilcox, Philadelphia, Pa., assignor, by mesne assignments, to York Food Machinery Co., Columbia, Pa., a corporation of Delaware Application July 29, 1955, Serial No. 525,285

11 Claims. (Cl. 107—15)

This invention relates to molding machines, and particularly to a machine for molding pliable plastic materials.

In the molding of certain pliable plastic materials, such as the forming and shaping of candy bars, assorted candies, and the like, difficulty is experienced in obtaining uniformity as to size, shape and weight per unit produced. In fact, in some cases, there are machines which often provide only half-formed finished products, necessitating rejection thereof from a salable standpoint, resulting in a waste of material and man hours consumed, and representing an ultimate production loss. Other such machines exhibit difficulty in depositing the formed plastic material on conveyor belts with resultant misalignment of the molded products, and, in some cases, the fusion thereof due to their close proximity on said belts. Still others require handling of the individual pieces formed by an operator, which not only is time consuming to the extent of reducing the production rate, but also is unsanitary when dealing with edible products for human consumption.

With the above conditions in mind, it is the foremost objective of the present invention to provide an improved machine for molding pliable plastic materials.

It is another object of this invention to provide a machine for molding pliable plastic materials which produces finished products which are uniform as to size, shape and weight.

It is a further object of this invention to provide a machine for molding pliable plastic materials which is capable of depositing the molded products on a moving conveyor belt in direct and consistent alignment with one another, and with sufficient spacing therebetween to prevent fusion of one plastic piece with an adjacent one.

Another object of this invention is to provide a machine for molding pliable plastic materials which is capable of providing many differently shaped pieces at one time.

Still another object of the present invention is to provide a machine for molding pliable plastic materials which is automatic in operation, dispensing with the handling of the plastic material by an operator during the molding process.

A still further object of the present invention is to provide an improved machine for molding pliable plastic materials wherein rejection of finished pieces, and hence waste, is reduced to a minimum.

Another object of this invention is to provide a machine for molding pliable plastic materials which is capable of a high production rate.

A further object of the invention is to provide a machine fold molding pliable plastic materials which is adaptable to a variety of uses in the handling of plastic materials and related materials of a plastic nature.

These objects, together with other objectives and advantages to be derived from the present invention, will at once become apparent from a reference to the following detailed description of the invention read in conjunction with the accompanying drawings, wherein similar numerals refer to similar parts throughout the several views.

Figures 1, 9:
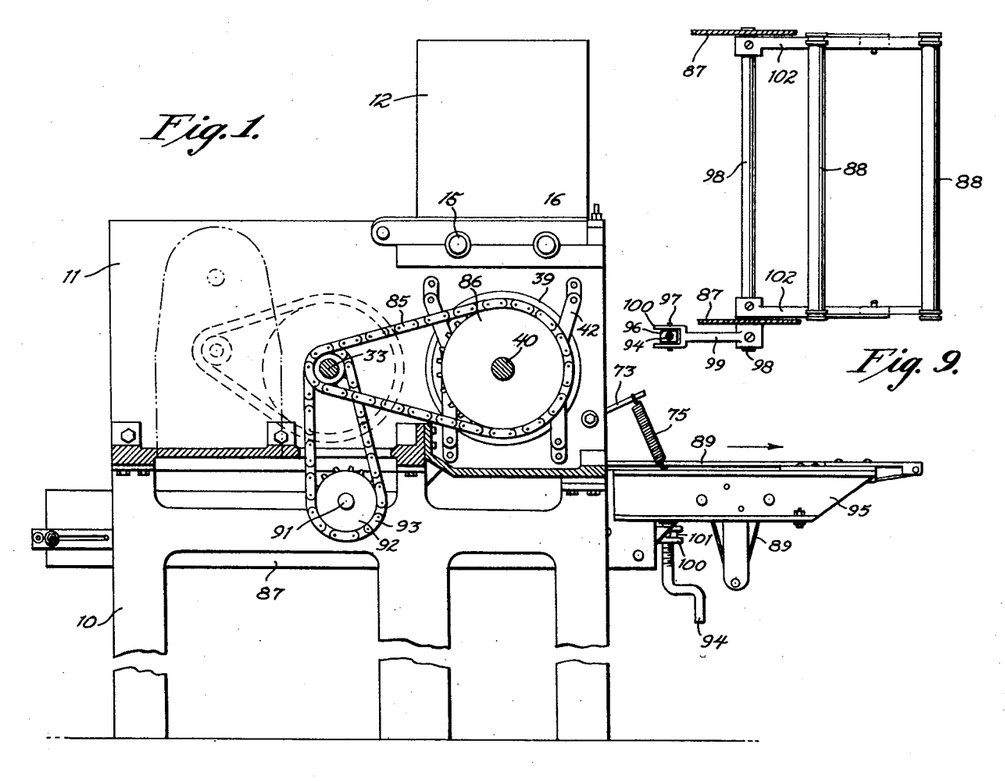
Figure 1 is a left side elevational view of the molding machine of the present invention, as viewed from the front thereof, with parts in section, illustrating the chain drive system as viewed from the outside of the machine and showing the direction in which the conveyor belt moves relative thereto.
Figure 9 is a partial sectional view of the conveyor belt inclination control, taken along the line 9—9 of Fig. 2.
Figures 2, 7, 8:
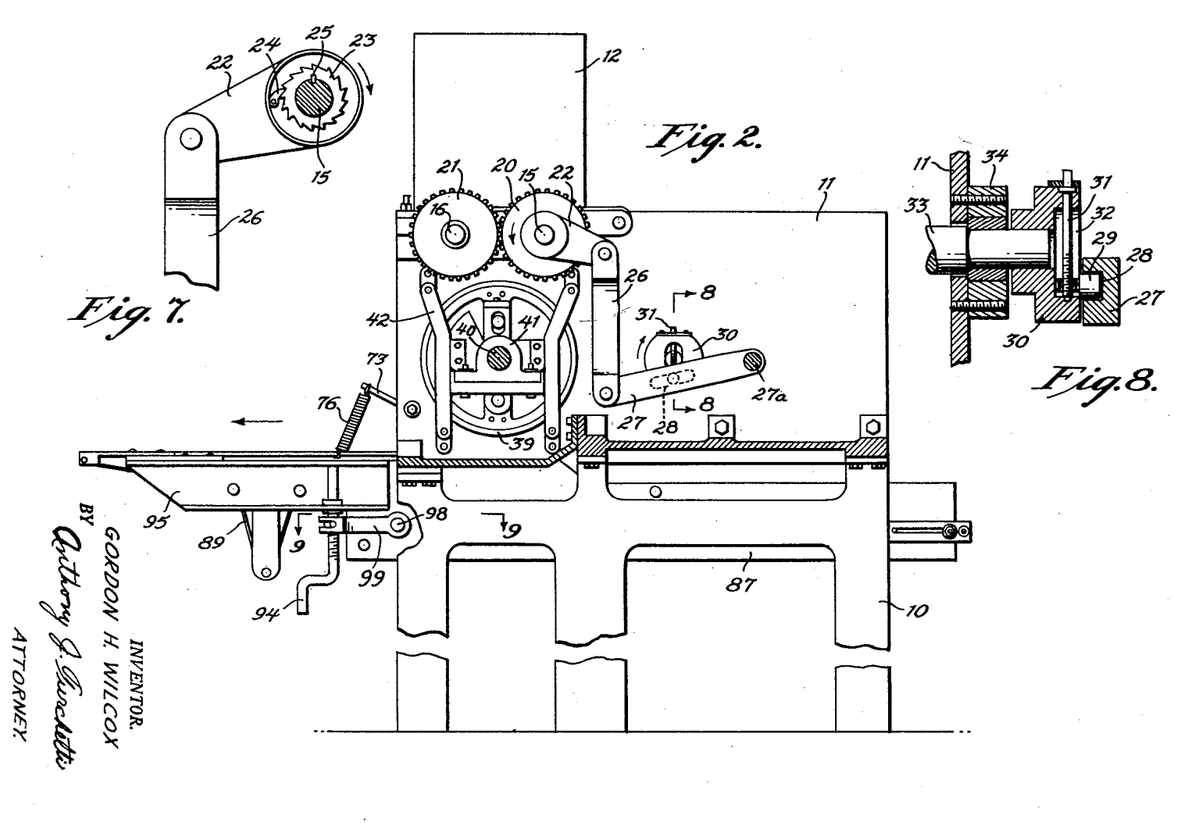
Figure 2 is a right side elevational view of the molding machine of Fig. 1, as viewed from the front thereof, showing the feed control mechanism, in part.
Figure 7 is a detail view in side elevation of the ratchet and pawl which form a vital part of the feed control mechanism shown in Fig. 2.
Figure 8 is a cross-sectional view, with parts broken away, of the eccentric drive of the feed control mechanism, taken along the line 8—8 of Fig. 2.
Figure 3:
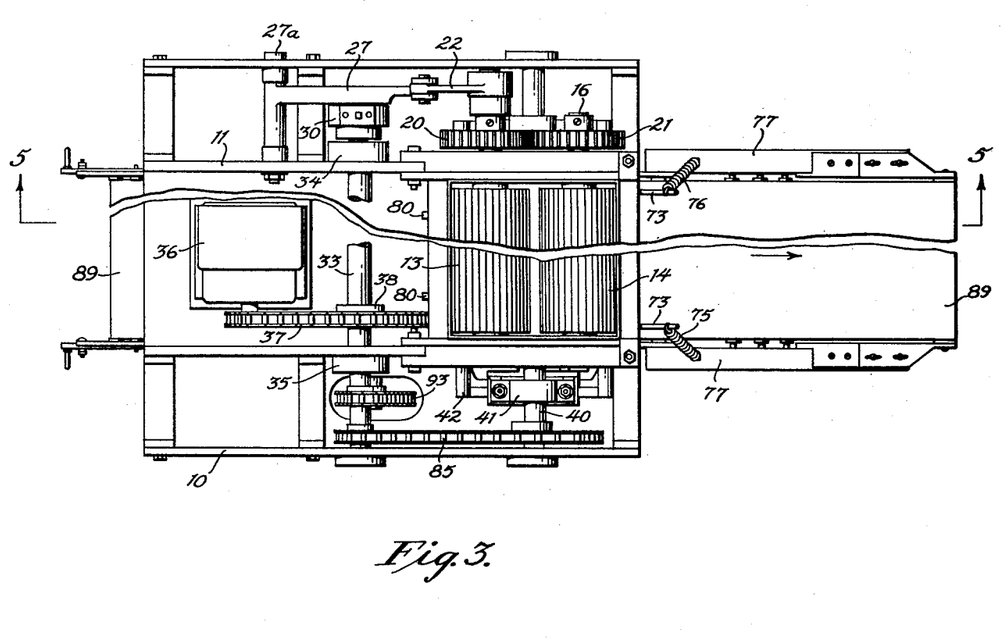
Figure 3 is a top plan view of the molding machine shown in Figs. 1 and 2.

Referring to the drawings, and particularly Figs. 1, 2, and 3 thereof, the numeral 10 represents the basic frame of the present molding machine which supports its various parts which, in combination, constitute the invention to be described in detail below.

Figures 5, 6:
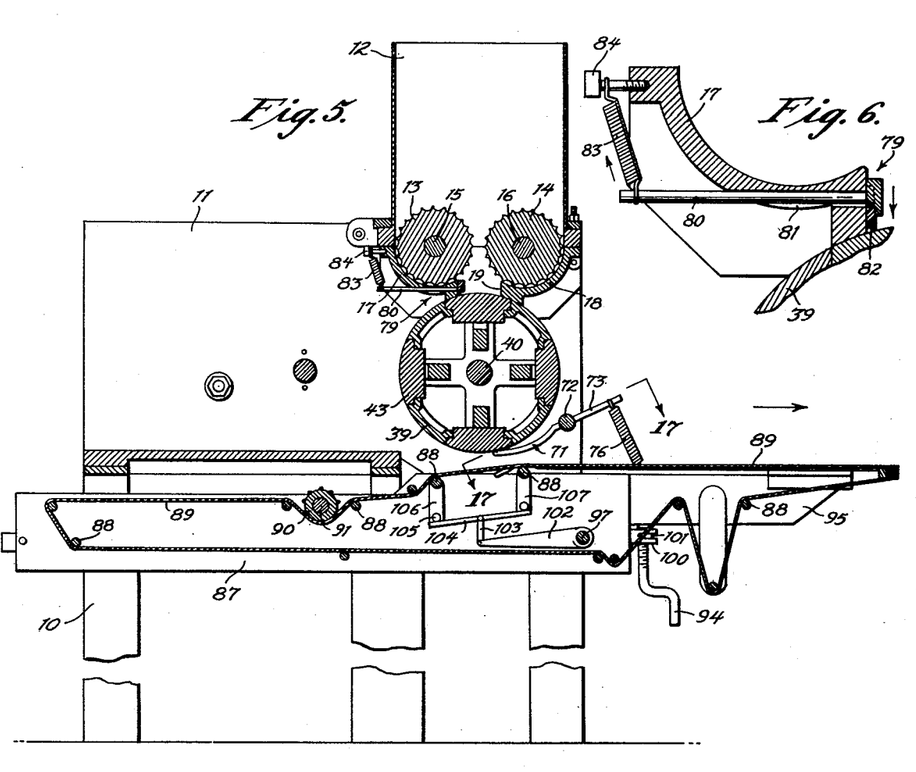
Figure 5 is a cross-sectional view of the present molding machine taken along the line 5—5 of Fig. 3.
Figure 6 is an enlarged view, partly in section, of the bottom of the feed hopper as shown in Fig. 5, particularly illustrating the scraper mechanism used for scraping the molding drum clean of excess plastic material.

Mounted upon the frame 10 is a large boxlike housing 11 upon which and within which are mounted the major constituents of the present molding machine. This housing may be bolted to the frame 10, or affixed thereto by other suitable attachment means. On top of the housing 11, and to one end thereof, is mounted a feed hopper 12 which is adapted to receive the pliable plastic material and convey it to the molds for forming individually molded units. Residing within the bottom of the hopper 12, transversely thereof, is a pair of serrated feed rollers 13 and 14 which lie in spaced parallel relationship to one another with a slight space existing therebetween to permit the passage of plastic feed therethrough, as shown in Figs. 3 and 5. The said rollers are rotatably mounted on shafts 15 and 16 and lie within cradles 17 and 18 in the bottom of the hopper 12, which cradles are separated by a feed discharge opening 19. Mounted on the shafts 15 and 16, exteriorly of the hopper 12, on the right side thereof looking rearwardly, are a pair of spur gears 20 and 21, as shown in Fig. 2, which are in enmeshment and which cause rotation of the feed rollers 13 and 14, as will be described below.

Attached to the end of the shaft 15 adjacent to the gear 20, is a bell-crank 22 which houses a ratchet 23 and pawl 24 (Fig. 7) for the controlled movement of the feed rollers 13 and 14, the said ratchet 23 being fixedly mounted upon the shaft 15 by means of a key 25, while the bell-crank 22 is slidable relative to said shaft. Pivotally connected to the bell-crank 22 is a link 26 whose opposite end is pivotally connected to a lever 27 which is fixedly mounted on a shaft 27a which is supported from the frame 10 and adapted for arcuate movement. The lever 27 is provided with an elongated slot 28 which receives a roller 29 adjustably carried by a rotatable eccentric 30, as shown in Figs. 2 and 8. It is the eccentric 30, through the roller 29, which imparts arcuate movement to the spur gears 20 and 21, and hence to the feed rollers 13 and 14. The roller 29 is adjustably mounted on a threaded stem 31 which resides in an elongated opening 32 in the eccentric 30. The eccentric 30 is in turn fixedly mounted on a main drive shaft 33 which is supported in bearings 34 and 35 carried by the housing 11. Mounted on the frame 10, within the housing 11, is a motor 36 which rotatably drives the main drive shaft 33 through a chain 37 surrounding a sprocket wheel 38 on said shaft, as shown in phantom in Fig. 1. Thus, as the shaft 33 rotates, the eccentric 30 is also caused to rotate so that the roller 29 moves reciprocally within the slot 28 in the lever 27, imparting an arcuate movement to the bell-crank 22 on the shaft 15 through the lever 26. The spur gear 20, which is also on the said shaft 15, is accordingly limited in its arcuate movement by virtue of the pawl 24 pivotally attached to the bell-crank 22 and the ratchet 23 on said shaft. This arcuate movement is thus transmitted to the second spur gear 21 in enmeshment with the gear 20 and then to the feed rollers 13 and 14 which are mounted on the shafts 15 and 16 within the hopper 12. It will be noted that since the spur gears 20 and 21 are in enmeshment, they will rotate in opposite directions, toward each other, imparting a similar rotating motion to the feed rollers. Thus, the serrated feed rollers 13 and 14 will force plastic material residing within the hopper 12 through the space existing therebetween each time arcuate movement is imparted thereto. It will be noted that the arcuate movement of the feed rollers may be varied by adjustment of the roller 29 on the threaded stem 31 of the eccentric 30, which in turn will vary the stroke of the lever 27. Thus, as the roller 29 approaches a central position on the length of said stem, the stroke of the lever 27 will accordingly decrease, with a consequent reduction in the arcuate movement of the feed rollers, and conversely. This will, of course, decrease the amount of plastic material fed to the molds, as will be described below.

Figure 10:
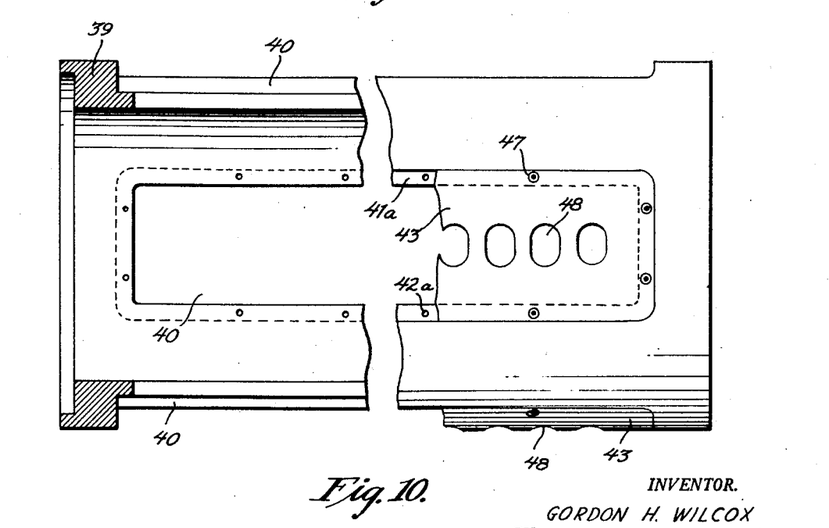
Figure 10 is a partial sectional view of the molding drum of the present machine, showing the removable mold plates which provide for variation in the size and shape of product formed.
Figure 11:
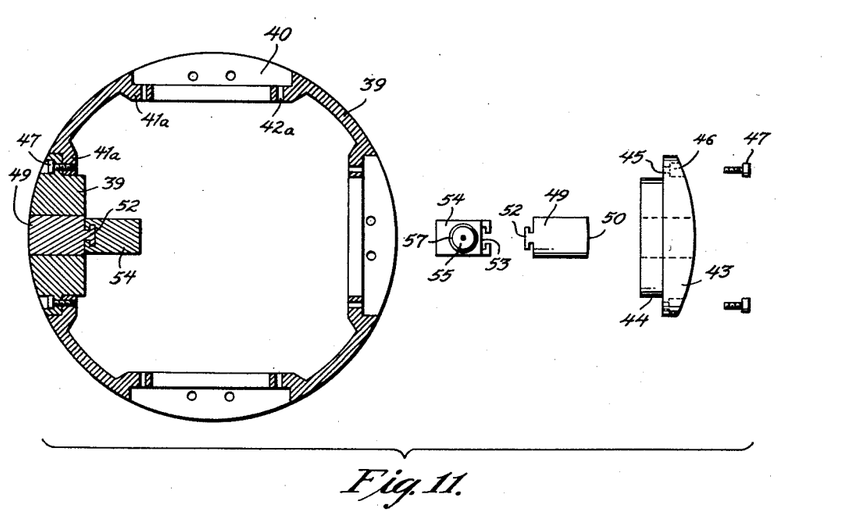
Figure 11 is a detailed cross-sectional view of the molding drum of the present machine, illustrating the mold plates and their related plungers in both assembled and exploded relationship.
Figure 12:
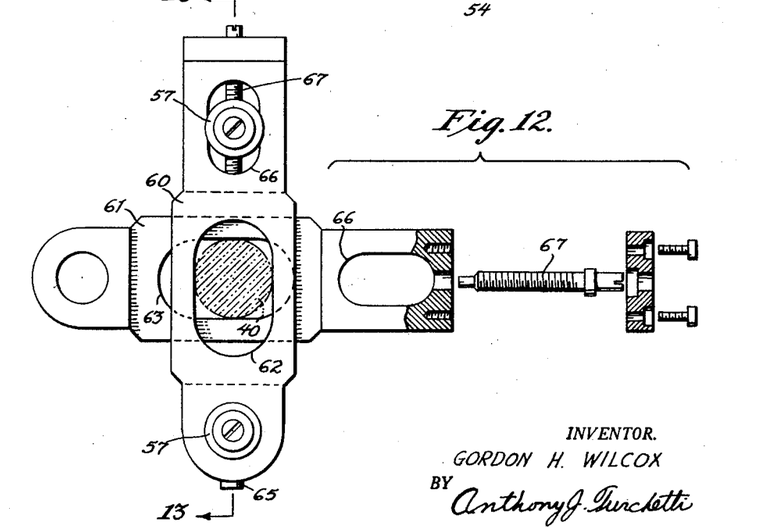
Figure 12 is an enlarged detail view, partly in section, of the plunger-carrying cross-bars located at opposite ends of the molding drum, and illustrating the screw means by which the distance between plungers may be regulated.

Residing within the housing 11, directly below the feed rollers 13 and 14, so as to lie adjacent to the feed discharge opening 19 in the bottom of the hopper 12, is a large cylindrical molding drum 39 which performs the molding function of the present machine. The drum 39 is rotatably supported by a horizontally disposed shaft 40 whose ends are journalled in bearings 41 mounted on brackets 42 carried by the housing 11, as shown in Figs. 2 and 3. Referring now to Figs. 10 and 11, the molding drum 39 will be described in detail. Spaced 90° apart about the surface of the drum 39 are arcuate cut-out portions 40 which are substantially rectangular in configuration as viewed from the drum surface and which are subtended by shoulders 41 extending laterally from the inner surface of said drum 39, as indicated in Fig. 11. The shoulders 41 are drilled and tapped as at 42a to receive bolts in a manner to be described below.

Figures 13, 14:
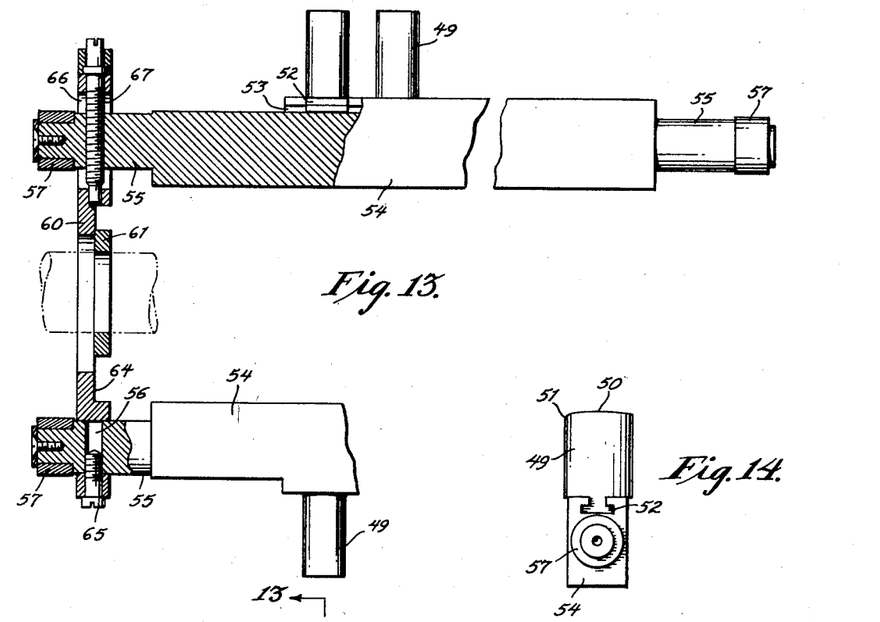
Figure 13 is a cross-sectional view of the plunger-carrying cross-bars, taken along the line 13—13 of Fig. 12.
Figure 14 is a detail view of one of the plungers shown in assembled relationship with the plunger rod which supports it, and illustrating the T-shaped keyway means for slidably attaching the plunger thereto.

Removably residing within the said cut-out portions 40 are arcuate mold plates 43 which are also substantially rectangular in configuration and which are of a size corresponding to the said cut-out portions. The arcuate surface of said mold plates is of the same radius as the drum 39 and the said plate is reduced as at 44 so as to provide a shoulder 45. The peripheral edge of the plate is drilled to provide apertures 46 for receiving attachment bolts 47. Extending across the lengthwise expanse of the plate 43 along the longitudinal axis thereof is a plurality of openings 48 which pass through the thickness of said plate and which are provided for the purpose of forming mold pockets for receiving plastic material. These openings 48 may be made of different sizes, shapes, and numbers on the separate plates 43 so as to produce a variety of finished molded products. Slidably residing within the openings 48 in pistonlike fashion are plungers 49 having a shape corresponding to the particular openings 48 in which they reside. One surface 50 of the plungers 49 is arcuate to coincide with the arcuate surface of the plate 43 and has one end edge 51 which is provided with a small radius (Fig. 14) to act as a leading edge during the molding operation, for a purpose to be described below. The opposite surface of the plungers 49 is provided with a T-shaped key 52 which is received in a similar T-shaped keyway 53 in one surface of a plunger rod 54, upon which the plungers 49 are mounted. The plunger rod 54 is substantially rectangular in cross section for the majority of its length, and is provided with ends 55 which are circular in cross section. It will be noted from Fig. 13 that the keyway 53 does not extend for the entire length of the plunger rod 54. It will also be noted that the ends 55 are provided with tapped bores 56 for a purpose soon to become apparent. Slidably mounted on the ends 55 are sleeves 57 which are intended to act as cam followers in a manner to be described below.

In attaching the mold plates 43 to the drum 39, the reduced portions 44 thereof are received within the cut-out portions 40 until the shoulders 45 of said plates come to rest on the shoulders 41 which subtend said cut-out portions. The keys 52 of the plungers 49 are then slidably inserted into the keyways 53 and inserted into the interior of the drum 39. The plate is then bolted in place by means of bolts 47. The ends 55 of the plunger rods 54 pass through slots 58 in end plates 59 in the end of the drum 39. The means by which the plungers 49 are caused to move within the openings 48 will now be described with reference to Figs. 12, 13, 15 and 16.

Mounted on the shaft 40 exteriorly of the drum 39 on both sides thereof and adjacent to the end plates 59 are a pair of mutually perpendicular cross-bars 60 and 61 which are movable relative to the shaft 40 in a direction perpendicular to the axis thereof, and which are also movable relative to each other. To permit movement of said cross-bars relative to the shaft 40, they are provided with elongated openings 62 and 63, respectively, whose axes are perpendicular and through which passes said shaft. To permit the sliding movement of the cross-bars 60 and 61 relative to each other, the cross-bar 60 is provided with a cut-out area 64 at a point near the center of its longitudinal axis where the elongated opening 62 resides, and the corresponding portion of the cross-bar 61 is slidably seated therein. It will be noted that the cut-out area 64 is larger than the width of the cross-bar 61 to accommodate the movement thereof, in a manner and for a purpose to be described below.

One end of each of the cross-bars 60 and 61 is provided with a bore in which are fixedly mounted the ends 55 of a pair of adjacent plunger rods 54, as by means of a bolt 65 threadably received in the tapped bores 56 in said ends. The opposite end of each of the cross-bars 60 and 61 has an elongated aperture 66 through which passes a long screw 67, turnably mounted in said cross-bars from the ends thereof, in alignment with the axis of said aperture. Passing through the apertures 66 and threadably mounted on the screws 67 are the ends 55 of the remaining pair of adjacent plunger rods 54. It will be remembered, at this point, that there are four plunger rods within the drum 39 to provide plungers for the four mold plates 43 which are spaced at 90° intervals about the surface of the drum. By virtue of their threaded mounting on the screws 67, the plunger rods 54, whose ends reside in the elongated apertures 66, are movable along said screws so as to permit variation of the distance between the movable rod 54 and the fixed rod 54 in the opposite ends of the cross-bars for a purpose to be described below. This may be accomplished by simply turning the screws 67, as desired. It will be noted from Figs. 13 and 15 that thus mounted, the sleeves 57 on the ends 55 extend outwardly from the cross-bars 60 and 61.

Figure 4:
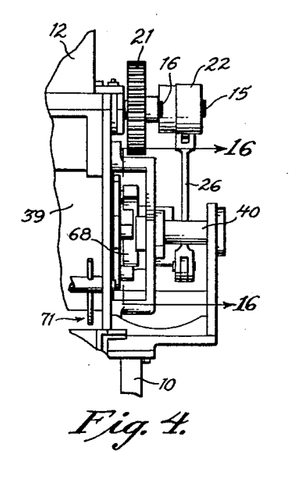
Figure 4 is an enlarged detail view in front elevation of a part of the right side of the present molding machine looking toward the rear, as in Fig. 2.
Figure 16:
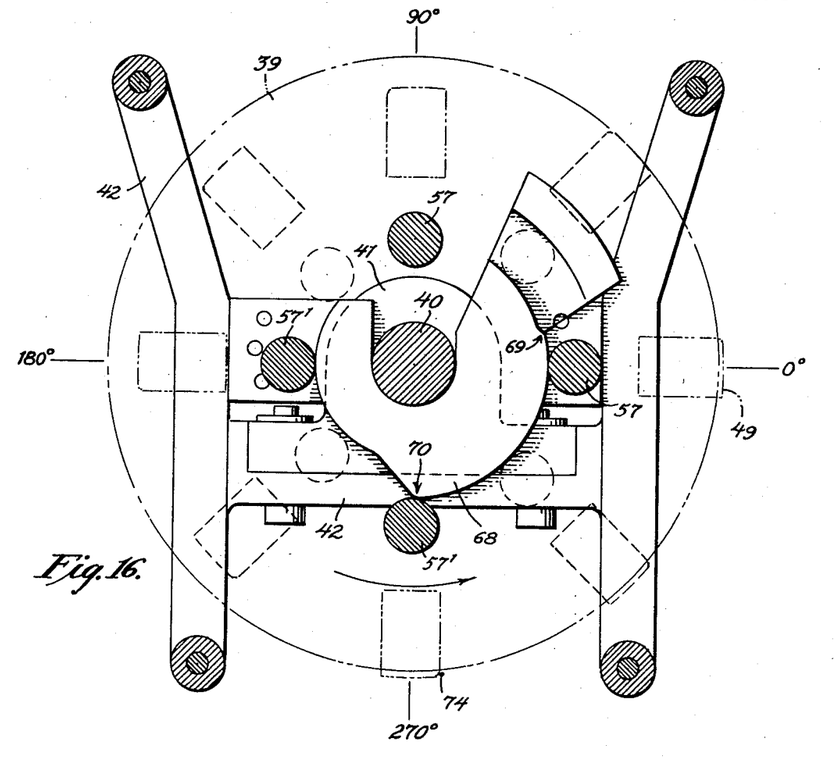
Figure 16 is a sectional view of the plunger control mechanism, taken along the line 16—16 of Fig. 4, showing the molding drum and plungers in phantom, and illustrating the fixed cam at the ends of the drum which controls the cycle of movement of the plungers within the mold plates, the position of a given plunger during one complete revolution of the drum being shown in phantom.

Fixedly mounted on the brackets 42 on both sides of the drum 39 is a cam 68 which partially surrounds the shaft 40 of said drum. Said cam is fixed against rotation, and in conjunction with the sleeves 57 on the plunger rod ends 55 causes the movement of the plungers 49 within the openings 48 as the drum 39 rotates. The movement of a typical plunger during one complete revolution of the drum 39 is depicted in phantom in Fig. 16. Assuming that Fig. 16 represents a right-side view of the molding machine as viewed from the front and looking outwardly from the inside thereof along the line 16—16 of Fig. 4, it will be noted by the arrow shown that the drum 39, also shown in phantom, is rotating in a counterclockwise direction. The phantom line shown represents the outermost surface of the drum 39. Considering the drum in terms of conventional polar coordinates, it will be seen that at the 0° position of the drum, as shown in Fig. 16, one of the plungers 49 projects approximately ⅛" from the drum surface, while its counterpart on the opposite end of the same cross-bar (not shown) lies retracted within the opening 48 in the mold plate 43 of the drum. It will be noted that in this position, the sleeves 57 and 57' on the ends of both plunger rods (also not shown) are in cam-follower contact with the cam 68. Continuing in a counterclockwise direction, it will be seen that there is a slight dip 69 in the cam periphery at a point between the 0° and 30° position of the drum. As one sleeve 57 passes over this dip 69, the plunger 49 retracts slightly within the drum. It is preferred that the extent of this dip 69 be such that the plunger 49, on retraction, will become flush with the drum surface. In the 90° position of the drum, the opposite sleeve 57' on the same cross-bar contacts a high point 70 at the 270° polar location on the cam, as shown. Now, inasmuch as a pair of opposed plunger rods 54 are fixedly mounted on the same cross-bar, as described above, and since the cross-bars 60 and 61 are slidable relative to each other and to the shaft 40, as the sleeve 57' on the end of one plunger rod contacts the high point 70 of the cam, the entire cross-bar to which it is attached will move downwardly carrying the opposed plunger rod downwardly with it. At this point the plungers 49 in the 90° position of the drum will be retracted within the openings 48, while the plungers in the 270° position will project therefrom a slight distance, preferably ⅛ inch. This particular motion is depicted clearly in both Figs. 15 and 16.

It is to be emphasized here that the high point 70 of the cam 68 has been particularly located in the 270° position of the drum orbit so that the upper plungers 49 at the 90° position will be retracted when directly under the feed discharge opening 19 of the hopper 12, as plastic material to be molded passes therethrough. This will insure complete filling of the openings 48 in the mold plate 43; for it has been found that if the plungers 49 are retracted before reaching the hopper discharge opening 19, air becomes entrapped in the openings 48, resulting in incomplete filling thereof with plastic material. In addition, when the plungers are retracted while under the feed discharge opening, the suction effect created aids in filling the openings 48 by drawing plastic material thereinto.

Figure 15:
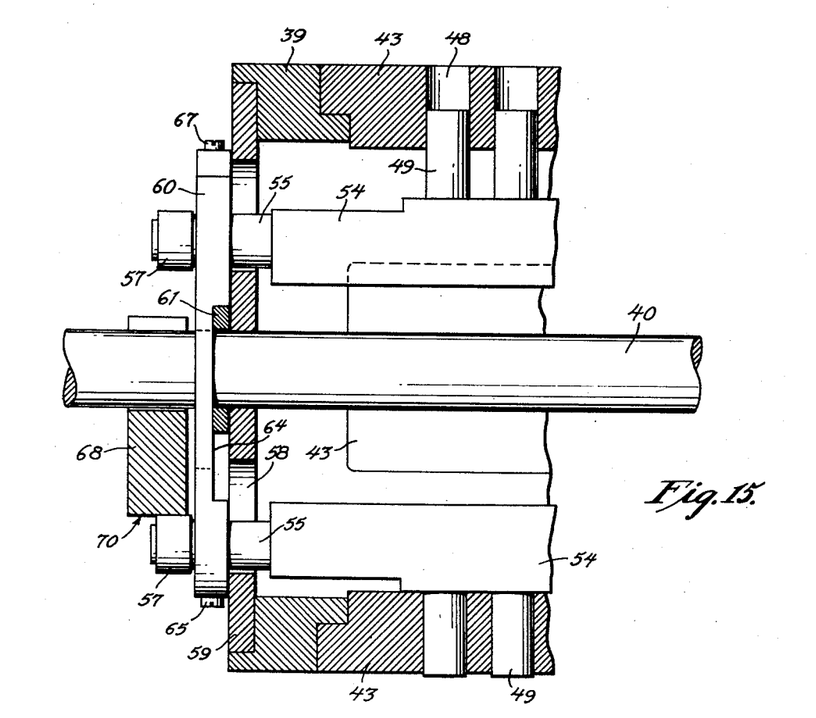
Figure 15 is an enlarged partial sectional view of the molding drum, with parts broken away, showing the plungers in assembled relationship with the mold plates, and illustrating the cam by means of which the cross-bars at the ends of the drum control the movement of the plungers.
Figure 17:
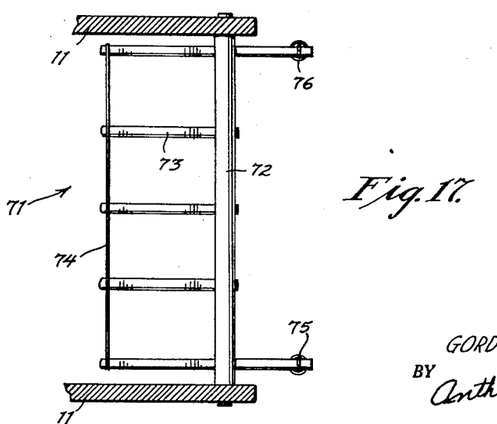
Figure 17 is a plan view of the wire scraper used for cleanly separating the molded plastic product from the plunger, after molding.
Figure 18:
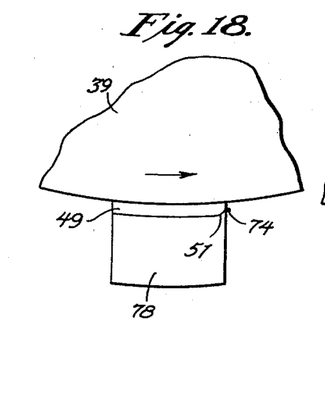
Figures 18, 19, and 20 illustrate, diagrammatically, the successive positions of the wire scraper of Fig. 17 in cleanly separating the molded product from the plunger, and the position of the wire relative to said plunger.

As the plungers 49 in the 270° position project outwardly from the openings 48, as in Figs. 15 and 16, the plastic material contained therein will be forced out, assuming the shape of the particular opening 48 in which it has resided. Since the plastic material may, in some cases, adhere to the end of the plunger, depending of course upon the viscosity of said material, a wire scraper 71 is located at the bottom of the drum 39 to cleanly cut or scrape the molded material from the plunger. As shown in Fig. 17, the scraper 71 consists of a rod 72 pivotally mounted on the side walls of the housing 11, from which rod a plurality of fingers 73 extend having a cutting wire 74 attached to the ends thereof. The two fingers 73 adjacent to the housing side walls are extended beyond the rod 72 and have coil springs 75 and 76 connected thereto and anchored to flanges 77 of the frame 10 (Fig. 3). The manner in which the wire scraper 71 operates to cut the molded plastic material from the end of the plunger 49, is shown diagrammatically in Figs. 18, 19, and 20.

Figure 19:
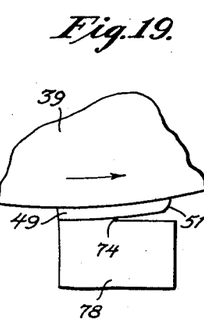
Figure 20:
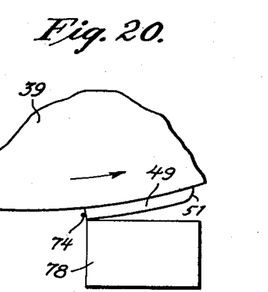

First of all, it will be noted that the plunger 49 preferably projects outwardly from the surface of drum 39 a distance of approximately ⅛ inch. At the same time, the wire scraper 71 is so mounted on the side walls of the housing 11 that the cutting wire 74 lies at a distance of less than ⅛ inch from the surface of drum 39, or the wire 74 can even be made to normally contact said surface. It will also be noted that the curved edge 51 of the plunger 49 lies in the leading edge position thereof, in the direction of rotation, while its trailing edge is cut off abruptly. A molded piece of plastic material is represented at 78. As the drum 39 rotates in a counterclockwise direction, the wire 74 will come into contact with the leading edge 51 of the plunger 49, as in Fig. 18. Continuing its rotation, the wire 74 will forcibly slide over the curved leading edge 51 along the end surface of the plunger 49, cleanly cutting the molded piece 78 therefrom, as shown in Fig. 19. Then, as the wire reaches the abruptly defined trailing edge of the plunger, it will snap back to its original free position, this snap effect cleanly separating the molded piece 78 from the plunger end surface, as shown in Fig. 20. It is important to note the joint action of the biasing coil springs 76 and 77 and the strained action of the wire 74 in passing over the end of the plunger 49, in making the clean separation of the molded piece 78 therefrom, as described. As the molded piece 78 is separated from the plunger end, it is received on a conveyor which lies directly therebeneath, and which will be described in detail below.

A second scraper 79 is located near the top of the drum 39 at a point slightly beyond the 90° position of the rotating drum, as shown in Figs. 5 and 6. This scraper performs the function of scraping the surface of the drum 39, and particularly the mold plate 43, clean as the drum passes from beneath the feed hopper 12. As shown more clearly in Fig. 6, the scraper 79 consists of a pair of rods 80 (only one being visible) which are horizontally disposed in openings 81 provided therefor in the cradle 17 at the bottom of the hopper 12, so as to extend into the feed discharge opening 19, as indicated in Fig. 5. The end of said rod lying within said discharge opening carries a rigid scraper blade 82, preferably made from nylon which serves as a pressure seal between the hopper and the drum, and having a knife-edge in direct contact with the surface of the drum 39. This direct contact is maintained by means of a spring 83 attached to the other end of the rod 80, and anchored to the cradle 17 by a bolt 84.

The drum 39 is caused to rotate by means of a chain 85 passing over a sprocket wheel 86 on the shaft 40, the said chain deriving its power from the main drive shaft 33 which is connected to the motor 36 through chain 37, as illustrated in Figs. 1 and 3.

Turning now to Fig. 5, it is seen that a pair of spaced horizontally disposed frame members 87 are carried by the frame 10 and rotatably support therebetween a plurality of rollers 88 located at various positions throughout the length of said members, as shown in cross section in Fig. 5. Passing around these rollers 88 is a continuous conveyor belt 89, which is preferably made from linked wire loops, but which may also be made from canvas or other suitable material. Said belt 89 is driven by means of a belt drive 90 which is mounted on a shaft 91 to which is attached a sprocket wheel 92. A chain 93 on the sprocket wheel 92 derives driving power from the main drive shaft 33 to which it is connected, as shown in Fig. 1. The belt drive 90 extends across the machine between the frame members 87 and maintains a continuous driving contact with the conveyor belt.

Looking now at Figs. 2 and 5, it will be noted that the upper phase of the conveyor belt 89 immediately below the drum 39 is slightly inclined in the direction of the front of the machine, as shown in Fig. 5. Such an inclination, which is also in the direction of rotation of the drum 39, provides the distinct advantage of minimizing the distance that the severed molded pieces 78 must drop as they are separated from the ends of the plungers 49 by the wire scraper 71, as described above. Thus, damage to the said pieces and misalignment thereof on the conveyor belt is substantially eliminated.

The angle of inclination of the conveyor belt 89, immediately below the drum 39, may be varied by means of the mechanism shown in Figs. 2, 5, and 9. Referring thereto, it is seen that a threaded handle member 94 is turnably mounted on the flanges of a channel member extension 95 on the forward end of frame member 87. A threaded collar 96 resides on the threaded handle member 94 and has outstanding therefrom a pair of opposed pins 97. As the handle member 94 is turned, the collar 96 travels upwardly or downwardly thereupon, depending upon which direction said handle member is turned. Fixedly attached to a pivot rod 98 on the frame members 87 is an arm 99 having a bifurcated end 100. The said end 100 is provided with grooves 101 which receive the pins 97 on the threaded collar 96. Attached to the pivot rod 98 on the other side of the frame member 87, as shown in Figs. 5 and 9, is a lever 102. Pivotally attached to the end of the lever 102 is a push rod 103 which carries a horizontally disposed pivotal arm 104 which is adapted to exert an upward force on the studs 105 on the brackets 106 and 107 mounted for vertical slidable movement upon the frame members 87. These brackets rotatably carry a pair of the rollers 88.

To increase the angle of inclination of the conveyor belt 89 below the drum 39, the handle member 94 is turned so that the lever 102 pivots upwardly. The push rod 103 will accordingly raise the pivotal arm 104 so as to exert an upward force on the studs 105. As the tension in the conveyor belt 89 increases due to this upward force, the roller 88 on the bracket 106 will tend to rise at a slower rate than the roller 88 on the bracket 107 due to the close proximity of an adjacent roller, as shown in Fig. 5. Thus the conveyor belt 89 will assume an angular position rising in the direction of rotation of the drum 39. Of course, to decrease the angle of inclination, the handle member 94 need merely be turned in the opposite direction.

*Operation*

Although the operation of the present molding machine should be quite apparent from the above detailed description of its various parts and their relationship to each other, a brief summary description of its operation will be given below for the sake of completeness and clarity.

First of all, the molding drum 39 is assembled by attaching mold plates 43 having the desired shape, size and number of openings 48 therein for molding the pliable plastic material. Since there are four plates about the surface of the drum at 90° intervals, it may be desirable to select each plate so as to have differently shaped openings therein, for variety. The corresponding plungers 49 are then slidably attached to the plunger rod 54 by inserting the keys 52 in the keyway 53 thereof, and said rod is assembled with the cross-bars 60 and 61 in the manner described above. The distance between plunger rods 54 attached to a given cross-bar may then be regulated by turning the screws 67 upon which one rod is threadably mounted. This will of course determine the position of the plungers 49 in the openings 48. As has been pointed out above, it is preferred that this distance be regulated so that upon full extension of the plungers from the openings 48, the ends by virtue of the fixed cam action project ⅛ inch beyond the drum surface for the purpose of cleanly separating the molded plastic piece therefrom by the wire scraper 71.

The projection of the plungers 49 beyond the drum 39 is controlled by the points 69 and 70 on the fixed cam 47 and there is provided the additional facility of individual adjustment for depth of the plungers 49 which is accomplished by screws 67 located at the end of each plunger rod 54.

One adjustment 67 at the end of each plunger bar will give a fixed depth and as there are two opposite plunger rods 54 there can be two distinct sizes or thicknesses of the product with each rotation of the drum 39. To insure these different sizes of the product the sets of screws 67 must be individually adjusted.

Next, the angle of inclination of the conveyor belt 89 is set in accordance with the size of the molded piece to be formed, by simply turning the handle 94, as described above, to raise or lower the conveyor belt, as the case may be. For smaller molded pieces, it is desirable to adjust the belt so that it lies closer to the drum 39, to minimize the distance that the severed piece 78 must drop to reach the conveyor.

Having completed these preliminary assemblies and adjustments, the hopper 12 is filled with the pliable plastic material to be molded, and the motor 36 turned on. Driving power from the motor 36 is delivered to the main drive shaft 33 through the chain 37 and to the various other parts of the machine from said main drive shaft, as described above.

As the drive shaft 33 turns, the eccentric 30, which is carried thereby, will cause the lever 27 to describe an arcuate movement about the shaft 27a through the controlling reciprocating movement of the eccentric roller 29 in the slot 28 of said lever. This motion, as has already been described, is in turn transmitted to the spur gears 20 and 21, through the bell crank 22, the ratchet 23 and pawl 24 limiting the movement of said gears in accordance with the extent of the arcuate stroke of the lever 27. The spur gears 20 and 21, being in enmeshment and residing on the same shaft as the serrated feed rollers 13 and 14, respectively, will impart rotation to said rollers in a direction toward each other, and accordingly squeeze some of the plastic material downwardly therebetween and through the feed discharge opening 19 between the cradles 17 and 18 at the bottom of the hopper 12.

Meanwhile, the molding drum 39 is rotating, so that just as the eccentrically controlled lever 27 causes rotation of the feed rollers 13 and 14, one of the mold plates 43 comes into position directly beneath the feed discharge opening 19 with the plungers 49 retracting within the openings 48, under the action of cam 68, as described above. Plastic material will accordingly be drawn into the openings 48 from the suction effect of the retracting plungers, aided of course by the downward force of the serrated feed rollers. At the same time, the plungers 49 in the diametrically opposed mold plate will be moving outwardly from the openings 48, forcing the molded pieces therefrom. These will ordinarily adhere to the ends of the plungers. As the drum continues to rotate, the scraper blade 82 scrapes excess material from the surface of the drum, particularly in the area of the openings 48, so as to make the material therewithin flush with the drum surface. Simultaneously, the wire 74 located at the bottom of the rotating drum will forcibly slide over the end surface of the plungers 49, from the curved leading edge 51 thereof, cleanly separating the molded plastic piece 78 therefrom, as the drum rotates past said wire. The cleanly severed pieces 78 will then drop a short distance to the inclined conveyor belt 89, which is continually moving in a direction away from the rotating drum 39, toward the front of the machine, under the action of belt drive 90. Due to the proximity of said belt to the drum 39 at the point of severance of said pieces, they are deposited thereupon uniformly and in direct alignment with each other, with sufficient space existing therebetween to prevent the fusion of one piece with an adjacent one.

As the drum continues to rotate, the projecting end of the plungers 49 will be retracted to a position flush with the drum surface as the sleeves 57 on the plunger rod traverse the slight dip 69 in the cam 68. This will prevent any interference of the projecting plungers 49 with the cradle 18 of the hopper 12, as said plungers enter therebeneath. Then, of course, as the plungers reach the 90° position of the rotating drum, they will again be retracted under the influence of the high point 70 of the cam 68, drawing plastic material thereinto, and the above-described cycle will be completed.

It will be noted that in one complete revolution of the molding drum 39, four rows of molded plastic pieces are deposited upon the moving conveyor belt 89, inasmuch as the removable mold plates 43 are located at 90° intervals about the surface of said drum. The great production advantage gained from the use of the present machine should thus be quite obvious. It will also be noted that the complete molding process is substantially automatic, eliminating the handling of the plastic material and molded pieces by an operator.

Of course, it is apparent that since the mold plates 43 are removable, said plates may be selected and replaced at will so as to provide molds of various sizes and shapes in accordance with one's needs. It has also been seen that through the novel expedient of retracting the plungers while under the feed rather than before reaching the feed, complete filling of the openings in the mold plate is virtually assured, reducing the rejection of faulty finished pieces to a minimum. This reduction is aided by the clean severance of the molded pieces from the plungers by the cutting wire at the bottom of the drum, and the inclined conveyor belt which catches the pieces as they are severed. Thus, by the present invention, molded pliable plastic products are produced which are uniform as to size, shape and weight.

A machine of the type contemplated by the present invention is adaptable to a variety of uses. It is excellent for the production of candy bars or individual candies of the assorted chocolate variety. It may also find use, however, in the packaging of various materials of a pliable plastic nature, such as brick ice cream, or even the packaging of potato salad, cole slaw, and the like.

Although the present discussion of this invention has been limited to the above-described preferred embodiment, variations thereof are possible without departing from the spirit of the invention. It is to be understood, therefore, that the invention is not to be limited to the particular embodiment disclosed, but rather only to the inventive concept, as defined by the appended claims.

What is claimed is:

1. In a machine for molding pliable plastic materials, a frame, a vertically disposed feed hopper mounted on said frame, said hopper having a discharge opening in the bottom thereof, a horizontally disposed cylindrical drum mounted on a shaft journalled in said frame, said drum lying beneath said hopper adjacent to said discharge opening, said drum having a plurality of mold openings in its surface at spaced intervals thereabout, movable plungers residing within said mold openings, pairs of plunger rods within said drum to which rods said plungers are detachably connected, cross-bars supporting an opposed pair of plunger rods at the ends of said drum, separate means individual to each pair of opposing plunger rods for independently controlling the position of the plungers with respect to the exterior surface of the mold openings in the drum, a fixed cam carried by said frame and influencing said plunger rods so as to cause movement of said plungers within said mold openings, and a conveyor mounted on said frame beneath said drum for receiving molded pieces from said mold openings.

2. In a machine for molding pliable plastic materials, a frame, a vertically disposed feed hopper mounted on said frame, said hopper having a discharge opening in the bottom thereof, a horizontally disposed cylindrical drum mounted on a shaft journalled in said frame, said drum lying beneath said hopper adjacent to said discharge opening, said drum having a plurality of mold openings in its surface at spaced intervals thereabout, movable plungers residing within said mold openings, pairs of plunger rods within said drum to which rods said plungers are detachably attached, cross-bars supporting an opposed pair of plunger rods at the ends of said drum, said cross-bars being slidably movable relative to each other and to said shaft, separate means individual to each pair of opposing plunger rods for independently controlling the position of the plungers with respect to the exterior surface of the mold openings in the drum, a fixed cam carried by said frame and influencing said plunger rods so as to cause movement of said plungers within said mold openings, and a conveyor mounted on said frame beneath said drum for receiving molded pieces from said mold openings.

3. In a machine for molding pliable plastic materials, a frame, a vertically disposed feed hopper mounted on said frame, said hopper having a discharge opening in the bottom thereof, a horizontally disposed cylindrical drum mounted on a shaft journalled in said frame, said drum lying beneath said hopper adjacent to said discharge opening, said drum having a plurality of mold openings in its surface at spaced intervals thereabout, movable plungers residing within said mold openings, pairs of plunger rods within said drum to which rods said plungers are detachably attached, cross-bars supporting an opposed pair of plunger rods at the ends of said drum, said cross-bars being slidably movable relative to each other and to said shaft, separate means individual to each pair of opposing plunger rods for independently controlling the position of the plungers with respect to the exterior surface of the mold openings in the drum, a fixed cam carried by said frame and influencing said plunger rods so as to cause movement of said plungers within said mold openings, a conveyor mounted on said frame beneath said drum for receiving molded pieces from said openings, said conveyor being inclined in the direction of rotation of said drum, and means for varying the angle of inclination of said conveyor relative to said drum.

4. In a machine for molding pliable plastic materials, a frame, a vertically disposed feed hopper mounted on said frame, said hopper having a discharge opening in the bottom thereof, a horizontally disposed cylindrical drum mounted on a shaft journalled in said frame, said drum lying beneath said hopper adjacent to said discharge opening, removable mold plates mounted in the surface of said drum at spaced intervals, said mold plates having a plurality of mold openings in the surface thereof, movable plungers residing within said mold openings, pairs of plunger rods within said drum to which rods said plungers are detachably attached, cross-bars supporting a diametrically opposed pair of plunger rods at the ends of said drum, said cross-bars being slidably movable relative to each other and to said shaft, separate means individual to each pair of opposing plunger rods for independently controlling the position of the plungers with respect to the exterior surface of the mold openings in the drum, a fixed cam carried by said frame and influencing said plunger rods so as to cause movement of said plungers within said mold openings, and a conveyor mounted on said frame beneath said drum for receiving molded pieces from said mold openings.

5. In a machine for molding pliable plastic materials, a frame, a vertically disposed feed hopper mounted on said frame, said hopper having a discharge opening in the bottom thereof, a horizontally disposed cylindrical drum mounted on a shaft journalled in said frame, said drum lying beneath said hopper adjacent to said discharge opening, removable mold plates mounted in the surface of said drum at spaced intervals, said mold plates having a plurality of mold openings in the surface thereof, movable plungers residing within said mold openings, pairs of plunger rods within said drum to which rods said plungers are detachably attached, cross-bars supporting a diametrically opposed pair of plunger rods at the ends of said drum, said cross-bars being slidably movable relative to each other and to said shaft, separate means individual to each pair of opposing plunger rods for independently controlling the position of the plungers with respect to the exterior surface of the mold openings in the drum, a fixed cam carried by said frame and influencing said plunger rods so as to cause movement of said plungers within said mold openings, a conveyor mounted on said frame beneath said drum for receiving molded pieces from said openings, said conveyor being inclined in the direction of rotation of said drum, and means for varying the angle of inclination of said conveyor relative to said drum.

6. In a machine for molding pliable plastic materials, a frame, a vertically disposed feed hopper mounted on said frame, said hopper having a discharge opening in the bottom thereof, a horizontally disposed cylindrical drum mounted on a shaft journalled in said frame, said drum lying beneath said hopper adjacent to said discharge opening, removable mold plates mounted in the surface of said drum at spaced intervals, said mold plates having a plurality of mold openings in the surface, movable plungers residing within said mold openings, pairs of plunger rods within said drum to which rods said plungers are detachably attached, cross-bars supporting a diametrically opposed pair of plunger rods at the ends of said drum, said cross-bars being slidably movable relative to each other and to said shaft, separate means individual to each pair of opposing plunger rods for independently controlling the position of the plungers with respect to the exterior surface of the mold openings in the drum, a fixed cam carried by said frame and influencing said plunger rods so as to cause movement of said plungers within said mold openings, a conveyor mounted on said frame beneath said drum for receiving molded pieces from said mold openings, and a cutting member mounted on said frame between the drum and the conveyor.

7. In a machine for molding pliable plastic materials, a frame, a vertically disposed feed hopper mounted on said frame, said hopper having a discharge opening in the bottom thereof, a horizontally disposed cylindrical drum mounted on a shaft journalled in said frame, said drum lying beneath said hopper adjacent to said discharge opening, a scraper mounted in the bottom of said hopper and contacting said drum at said discharge opening, removable mold plates mounted in the surface of said drum at spaced intervals, said mold plates having a plurality of mold openings in the surface thereof, movable plungers residing within said mold openings, pairs of plunger rods within said drum to which rods said plungers are detachably attached, cross-bars supporting a diametrically opposed pair of plunger rods at the ends of said drum, said cross-bars being slidably movable relative to each other and to said shaft, separate means individual to each pair of opposing plunger rods for independently controlling the position of the plungers with respect to the exterior surface of the mold openings in the drum, a fixed cam carried by said frame and influencing said plunger rods so as to cause movement of said plungers within said mold openings, a conveyor mounted on said frame beneath said drum for receiving molded pieces from said mold openings, and a cutting member mounted on said frame between the drum and the conveyor.

8. In a machine for molding pliable plastic materials, a frame, a vertically disposed feed hopper mounted on said frame, said hopper having a discharge opening in the bottom thereof, a pair of feed rollers in said feed hopper adjacent to said discharge opening, a horizontally disposed cylindrical drum mounted on a shaft journalled in said frame, said drum lying beneath said hopper adjacent to said discharge opening, removable mold plates mounted in the surface of said drum at spaced intervals, said mold plates having a plurality of mold openings in the surface thereof, movable plungers residing within said mold openings, pairs of plunger rods within said drum to which rods said plungers are detachably attached, cross-bars supporting a diametrically opposed pair of plunger rods at the ends of said drum, said cross-bars being slidably movable relative to each other and to said shaft, separate means individual to each pair of opposing plunger rods for independently controlling the position of the plungers with respect to the exterior surface of the mold openings in the drum, a fixed cam carried by said frame and influencing said plunger rods so as to cause movement of said plungers within said mold openings, and a conveyor mounted on said frame beneath said drum for receiving molded pieces from said mold openings.

9. In a machine for molding pliable plastic materials, a frame, a vertically disposed feed hopper mounted on said frame, said hopper having a discharge opening in the bottom thereof, a pair of feed rollers in said feed hopper adjacent to said discharge opening, a horizontally disposed cylindrical drum mounted on a shaft journalled in said frame, said drum lying beneath said hopper adjacent to said discharge opening, removable mold plates mounted in the surface of said drum at spaced intervals, said mold plates having a plurality of mold openings in the surface thereof, movable plungers residing within said mold openings, pairs of plunger rods within said drum to which rods said plungers are detachably attached, cross-bars supporting a diametrically opposed pair of plunger rods at the ends of said drum, said cross-bars being slidably movable relative to each other and to said shaft, separate means individual to each pair of opposing plunger rods for independently controlling the position of the plungers with respect to the exterior surface of the mold openings in the drum, a fixed cam carried by said frame and influencing said plunger rods so as to cause movement of said plungers within said mold openings, a conveyor mounted on said frame beneath said drum for receiving molded pieces from said mold openings, and a cutting member mounted on said frame between the drum and the conveyor.

10. In a machine for molding pliable plastic materials, a frame, a vertically disposed feed hopper mounted on said frame, said hopper having a discharge opening in the bottom thereof, a pair of feed rollers in said feed hopper adjacent to said discharge opening, a horizontally disposed cylindrical drum mounted on a shaft journalled in said frame, said drum lying beneath said hopper adjacent to said discharge opening, a scraper mounted in the bottom of said hopper and contacting said drum at said discharge opening, removable mold plates mounted in the surface of said drum at spaced intervals, said mold plates having a plurality of mold openings in the surface thereof, movable plungers residing within said mold openings, pairs of plunger rods within said drum to which rods said plungers are detachably attached, cross-bars supporting a diametrically opposed pair of plunger rods at the ends of said drum, said cross-bars being slidably movable relative to each other and to said shaft, separate means individual to each pair of opposing plunger rods for independently controlling the position of the plungers with respect to the exterior surface of the mold openings in the drum, a fixed cam carried by said frame and influencing said plunger rods so as to cause movement of said plungers within said mold openings, a conveyor mounted on said frame beneath said drum for receiving molded pieces from said mold openings, and a cutting member mounted on said frame between the drum and the conveyor.

11. In a machine for molding pliable plastic materials, a frame, a vertically disposed feed hopper mounted on said frame, said hopper having a discharge opening in the bottom thereof, a pair of feed rollers in said feed hopper adjacent to said discharge opening, a horizontally disposed cylindrical drum mounted on a shaft journalled in said frame, said drum lying beneath said hopper adjacent to said discharge opening, a scraper mounted in the bottom of said hopper and contacting said drum at said discharge opening, removable mold plates mounted in the surface of said drum at spaced intervals, said mold plates having a plurality of mold openings in the surface thereof, movable plungers residing within said mold openings, pairs of plunger rods within said drum to which rods said plungers are detachably attached, cross-bars supporting a diametrically opposed pair of plunger rods at the ends of said drum, said cross-bars being slidably movable relative to each other and to said shaft, separate means individual to each pair of opposing plunger rods for independently controlling the position of the plungers with respect to the exterior surface of the mold openings in the drum, a fixed cam carried by said frame and influencing said plunger rods so as to cause movement of said plungers within said mold openings, a conveyor mounted on said frame beneath said drum for receiving molded pieces from said openings, said conveyor being inclined in the direction of rotation of said drum, means for varying the angle of inclination of said conveyor relative to said drum, and a cutting member mounted on said frame between the drum and the conveyor.

References Cited in the file of this patent

UNITED STATES PATENTS

| | | |
|---|---|---|
| 859,999 | Werner | July 16, 1907 |
| 1,473,590 | Wallace | Nov. 6, 1923 |
| 1,724,827 | Costello | Aug. 13, 1929 |
| 1,954,501 | Steere | Apr. 10, 1934 |
| 1,971,087 | Werner | Aug. 21, 1934 |
| 2,000,027 | Kazanjian | May 7, 1935 |
| 2,081,724 | Abbot | May 25, 1937 |
| 2,172,148 | Werner | Sept. 5, 1939 |
| 2,233,688 | Weidenmiller | Mar. 4, 1941 |
| 2,656,797 | Chambon | Oct. 27, 1953 |
| 2,688,940 | Zeun | Sept. 14, 1954 |